(12) United States Patent
Murase et al.

(10) Patent No.: US 9,670,859 B2
(45) Date of Patent: Jun. 6, 2017

(54) ELECTRONIC CONTROL UNIT HAVING ABNORMALITY DIAGNOSTIC FUNCTION OF SOAK TIMER

(71) Applicant: DENSO CORPORATION, Kariya, Aichi-pref. (JP)

(72) Inventors: Yuuichi Murase, Tokai (JP); Shinichiro Oda, Gamagori (JP)

(73) Assignee: DENSO CORPORATION, Kariya (JP)

( * ) Notice: Subject to any disclaimer, the term of this patent is extended or adjusted under 35 U.S.C. 154(b) by 80 days.

(21) Appl. No.: 14/296,819

(22) Filed: Jun. 5, 2014

(65) Prior Publication Data
US 2014/0365066 A1 Dec. 11, 2014

(30) Foreign Application Priority Data

Jun. 6, 2013 (JP) ................................ 2013-119920

(51) Int. Cl.
*H03K 17/00* (2006.01)
*F02D 41/22* (2006.01)
*F02D 41/04* (2006.01)

(52) U.S. Cl.
CPC ............ *F02D 41/22* (2013.01); *F02D 41/042* (2013.01); *Y02T 10/40* (2013.01)

(58) Field of Classification Search
CPC ......... F02D 41/22; F02D 41/042; Y02T 10/40
See application file for complete search history.

(56) References Cited

U.S. PATENT DOCUMENTS

2002/0029766 A1* 3/2002 Grass ...................... F02D 41/22
123/491
2008/0178015 A1* 7/2008 Sago ................ B60W 50/0205
713/300

FOREIGN PATENT DOCUMENTS

| JP | 2002-014702 | 1/2002 |
| JP | 2004-036564 | 2/2004 |
| JP | 2008-291814 | 12/2008 |
| JP | 2010-176541 | 8/2010 |

OTHER PUBLICATIONS

Office Action (2 pages) dated Jun. 30, 2015, issued in corresponding Japanese Application No. 2013-119920 and English translation (4 pages).

\* cited by examiner

*Primary Examiner* — Redhwan K Mawari
*Assistant Examiner* — Alan D Hutchinson
(74) *Attorney, Agent, or Firm* — Nixon & Vanderhye P.C.

(57) ABSTRACT

An electronic control unit includes a control portion and a soak timer. The control portion acquires first time information of a clock device when a power switch is turned off and stores the first time information in a nonvolatile storage portion. The control portion acquires second time information of the clock device when the soak timer activates the control portion or when the control portion receives an activation request. The control portion calculates a first time difference between the second time information and the first time information stored in the nonvolatile storage portion and determines an abnormality of the soak timer based a difference between the first time difference and the soak timer value of the soak timer.

8 Claims, 9 Drawing Sheets

ELECTRONIC CONTROL UNIT HAVING ABNORMALITY DIAGNOSTIC FUNCTION OF SOAK TIMER

CROSS REFERENCE TO RELATED APPLICATIONS

The present application is based on and claims priority to Japanese Patent Application No. 2013-119920 filed on Jun. 6, 2013, the contents of which are incorporated in their entirety herein by reference.

TECHNICAL FIELD

The present disclosure relates to an electronic control unit having an abnormality diagnostic function of a soak timer.

BACKGROUND

An conventional electronic control unit having an abnormality diagnostic function of a soak timer includes a control portion. When an ignition switch of a vehicle is turned on, the control portion in the electronic control unit is supplied with power and executes various controls. After that, when the ignition switch is turned off and the power supply to the control portion is stopped at a certain time point (hereafter, referred to as an off-time of the ignition switch), the soak timer measures an elapsed time from the off-time of the ignition switch. When the soak timer detects that the elapsed time from the off-time of the ignition switch reaches a setting time, the soak timer transmits an activation signal to the control portion. Then, the control portion executes a task (e.g., a diagnosis processing of an evaporation purge system) to be performed during an off-period of the ignition switch.

If the soak timer cannot measure time with accuracy, there is no credibility to the measured time. Thus, it is necessary that the control portion detects the presence or absence of abnormality of the soak timer and gives the reliability to the measured time of the soak timer on condition that the soak timer operates normally.

Generally, in a conventional abnormality diagnosis, a measured time of a counter provided in a control portion and a measured time of a soak timer are compared in a time from when the ignition switch is turned off to when a power switch (main relay) is turned off, and it is determined that the soak timer operates normally on condition that a difference of the measured times is within a predetermined time.

JP-A-2002-155798 discloses a technique in which an internal timer of a CPU starts when an ignition of an internal combustion engine is switched on, and time information generated by the internal timer and time information supplied from an external timer are compared so as to check a function ability of the timer.

However, the technique disclosed in JP-A-2002-155798 is on assumption that the internal timer of the CPU is supplied with power. Thus, the technique is suitable only in a case where the diagnosis is completed in the time from when the ignition switch is turned off to when the power switch is turned off and it is difficult to determine whether the soak timer measures time with accuracy when the power switch is in an off-state. Thus, in a case where the soak timer operates abnormally and cannot detect time with accuracy while the power switch is in the off-state, even if the soak timer turns on the power switch at an inappropriate time to activate the control portion, the abnormality may be missed.

SUMMARY

An object of the present disclosure is to provide an electronic control unit that can detect an abnormality of a soak timer even when the soak timer operates abnormally while a power switch is in an off-state.

An electronic control unit according to an aspect of the present disclosure includes a control portion and a soak timer. The control portion includes a nonvolatile storage portion. The control portion is supplied with power when a power switch is in an on-state and stops a processing while the power switch is in an off-state. The soak timer is supplied with power regardless of an on-off state of the power switch. The soak timer counts a soak timer value while the power switch is in the off-state and turns on the power switch at fixed intervals based on the soak timer value, thereby activating the control portion.

The control portion has an abnormality diagnostic function of detecting an abnormality in the soak timer value counted by the soak timer. The control portion acquires first time information of a clock device when the power switch is turned off and stores the first time information in the nonvolatile storage portion. The control portion acquires second time information of the clock device when the soak timer activates the control portion or when the control portion receives an activation request. The control portion calculates a first time difference between the second time information and the first time information stored in the nonvolatile storage portion, and determines an abnormality of the soak timer based a difference between the first time difference and the soak timer value counted by the soak timer.

The electronic control unit can detect an abnormality of the soak timer even when the soak timer operates abnormally while the power switch is in the off-state.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 1:
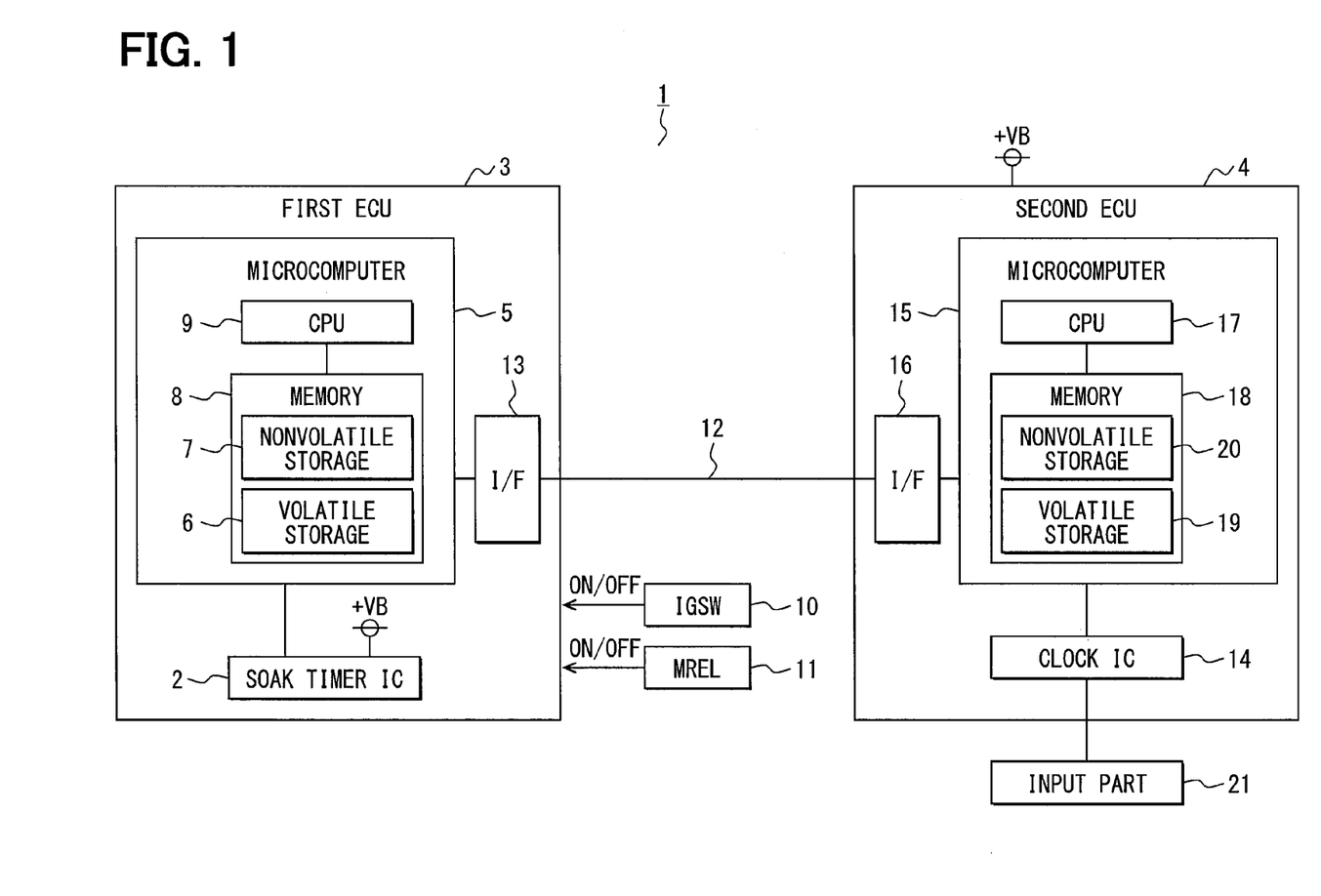
FIG. 1 is a block diagram illustrating an abnormality diagnosis system of a soak timer according to a first embodiment of the present disclosure.

An embodiment of an electronic control unit with a soak timer having an abnormality diagnostic function of a soak timer IC will be described with reference to the drawings. FIG. 1 is a block diagram illustrating a whole configuration of an abnormality diagnosis system 1 of a soak timer. The abnormality diagnosis system 1 includes a first electronic control unit (hereafter, referred to as the first ECU) 3 and a second electronic control unit (hereafter, referred to as the second ECU) 4. The first ECU 3 includes a soak timer IC 2. The second ECU 4 can operate as a clock device.

The first ECU 3 includes the soak timer IC 2 as a diagnostic object and a microcomputer 5. The microcomputer can operate as a control portion. The microcomputer 5 includes a memory 8 that includes a volatile storage portion 6 and a nonvolatile storage portion 7 and a CPU 9 connected with the memory 8. The microcomputer 5 receives an IGSW signal (ON/OFF) from an ignition switch (IGSW) 10 and transmits an MREL signal (ON/OFF) to a main relay (MREL) 11 corresponding to a power switch.

The IGSW signal becomes an on-off signal of the ignition switch 10. The MREL signal indicates an on-signal when the main relay 11 is on-controlled in response to turning-on of the ignition switch 10 or an off-signal when the main relay 11 is off-controlled in response to turning-off of the ignition switch 10. The soak timer IC 2 as the diagnostic object is connected to the microcomputer 5 in the first ECU 3. The soak timer IC 2 has a timer function for turning on the main relay 11 every predetermined time from a time at which the ignition switch 10 is turned off and the main relay 11 is turned off.

In the first ECU 3, the microcomputer 5 notifies the soak timer IC 2 of a soak rising time. When the ignition switch 10 is turned off, the soak timer IC 2 activates a timer. When a measurement time of the timer reaches the soak rising time, the soak timer IC 2 turns on the main relay 11 at the time (referred to as the soak rising time) and reactivates the microcomputer 5 (referred to as the soak rising). In the volatile storage portion 6 of the memory 8 in the microcomputer 5, various flags, a count value, and various variables are stored. In the nonvolatile storage portion 7 of the memory 8, values to be kept even when the main relay 11 is turned off are stored.

The flags include a diagnosis completion flag, an IGSW off-time setting completion flag, a soak timer value acquisition completion flag, a different electronic control unit (the second ECU 4) time check completion flag, and a diagnosis starting time acquisition completion flag. An initial value of the diagnosis completion flag is off. The diagnosis completion flag is off during execution of an abnormality diagnosis processing and is turned on when the abnormality diagnosis processing ends.

An initial value of the IGSW off-time setting completion flag is off. The IGSW off-time setting completion flag is off when the off-time is not set and is turned on when the off-time is set.

An initial value of the different electronic control unit (the second ECU 4) time check completion flag is off. The different electronic control unit (the second ECU 4) time check completion flag is turned on when a check result of the time transmitted from the second ECU 4 is determined to be OK and is off when the time is not checked.

An initial value of the soak timer value acquisition completion flag is off. The soak timer value acquisition completion flag is turned on when a current timer value shown by the soak timer IC 2 is set to the soak timer value and is off when the current time value is not set to the soak timer value.

The diagnosis starting time acquisition completion flag is used for determining whether diagnosis starting information indicating starting of the abnormal diagnosis is acquired from the second ECU 4. The diagnosis starting time acquisition completion flag is turned on when the diagnosis starting time acquisition information is acquired and is off when the diagnosis starting time information is not acquired.

The volatile storage portion 6 stores a soak timer value, a time for time check, and a time information operation history of the second ECU 4. An initial value of the soak timer value is 0, and the soak timer value becomes a count value of the soak timer IC 2. The time for time check has an initial value set to 0. The time for time check is used for determining whether current time information transmitted from the second ECU 4 is an accurate time. The time information operation history is history information that is stored when the time setting of the second ECU 4 is changed by a user setting processing or an internal processing of the second ECU 4 (e.g., a time automatic updating processing by a global positioning system (GPS)).

The nonvolatile storage portion 7 of the memory 8 stores IGSW off-time information corresponding to first time information. An initial value of the off-time information is set to, for example, 0. When the ignition switch 10 is turned off, the main relay 11 is also turned off. Accordingly, power supply to the microcomputer 5 in the first ECU 3 stops. Then, the information stored in the volatile storage portion 6 of the microcomputer 5 is deleted. However, the off-time information is stored in the nonvolatile storage portion 7. In the nonvolatile storage portion 7 of the memory 8, time check history information indicating OK or NG about time information transmitted from the second ECU 4 is stored. An initial value of the time check history information is set to, for example, "NG history is present."

The first ECU 3 further includes an interface (I/F) 13 of an in-vehicle network (e.g., a controller area network (CAN)) 12. The first ECU 3 can perform data communication with the second ECU (a timer ECU) 4 via the in-vehicle network 12. The second ECU 4 includes a clock IC 14. The clock IC 14 usually receives power VB and measures a time. Thus, the second ECU 4 can acquire an accurate time using the clock IC 14.

The first ECU 3 transmits a signal to the second ECU 4 via the in-vehicle network 12 in a waiting time in which the ignition switch 10 is the off-state other than the soak rising time, and the second ECU 4 transmits a signal to the first ECU 3 via the in-vehicle network every predetermined period (e.g., 16 ms).

The second ECU 4 includes a microcomputer 15 and an interface (I/F) 16 with the clock IC 14. The microcomputer 15 includes a CPU 17 and a memory 18. The memory 18 includes a volatile storage portion 19 and a non-volatile storage portion 20.

The volatile storage portion 19 stores variables such as the time information operation history and the current time. The time information operation history indicates whether time information of the clock IC 14 is changed by a user operation via the input part 21 or an internal processing of the microcomputer 15. As the initial value, the absence of the time information operation history is set. When the time information of the clock IC 14 is changed, the presence of the time information operation history is stored. The current time has an initial value set to 0 and is set to the time acquired from the clock IC 14.

Figure 2:
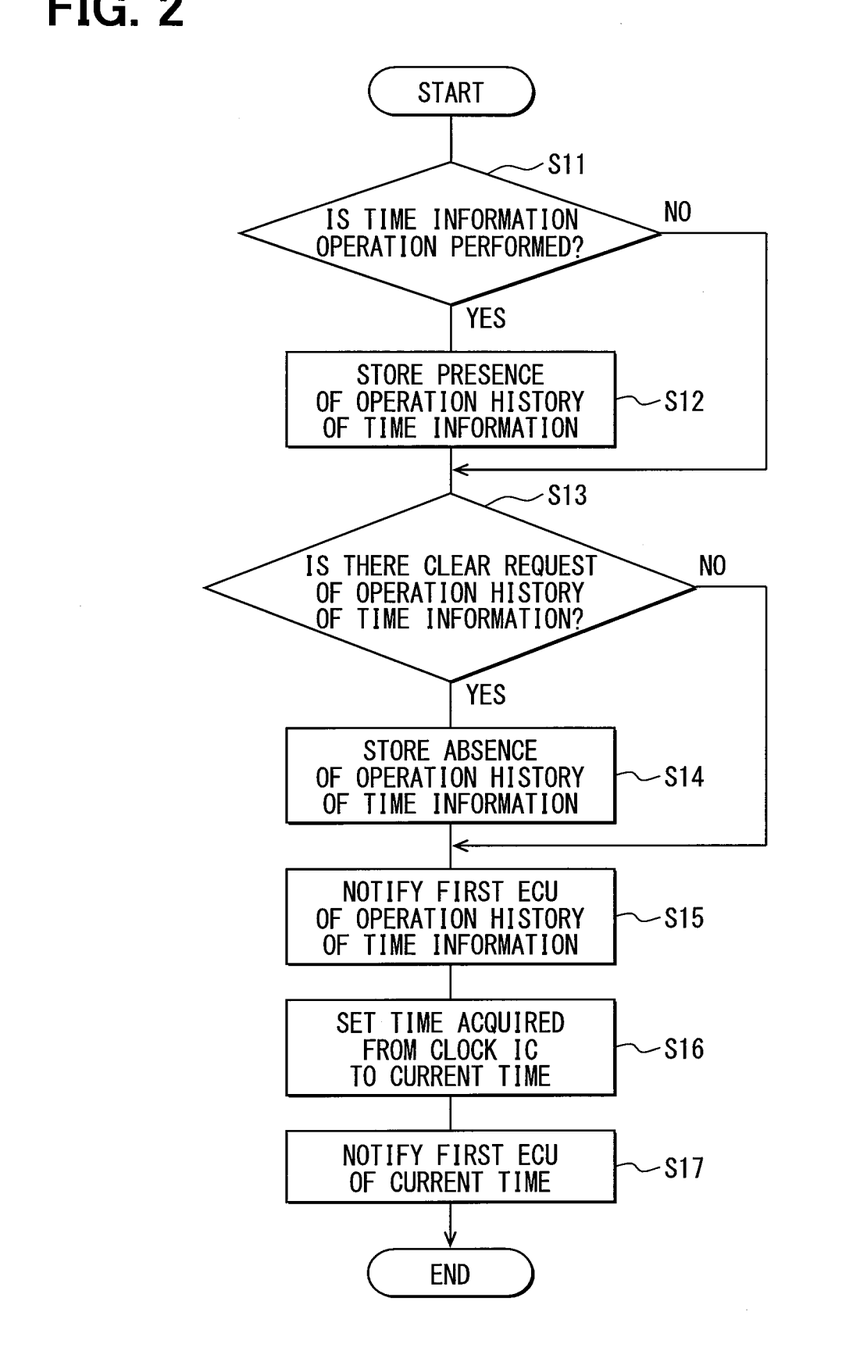
FIG. 2 is a flowchart illustrating a processing executed by a second ECU.

The abnormality diagnostic function of the soak timer IC 2 will be described with reference to FIG. 2 through FIG. 9. First, a processing executed by the second ECU 4 will be roughly described. FIG. 2 is a flowchart illustrating an internal processing routine of the second ECU 4. The internal processing routine indicates a timer interruption routine with a predetermined period (e.g., 16 ms) counted by the microcomputer 15.

The microcomputer 15 in the second ECU 4 monitors the time operation by a user via the input part 21 or the time operation by the internal processing of the microcomputer 15. When the time information operation is performed (S11: YES), the microcomputer 15 stores the presence of the time information operation history (S12). When the microcomputer 15 in the second ECU 4 receives a clear request of the time information operation history from the first ECU 3 (S13: YES), the microcomputer 15 deletes the time information operation history and stores the absence of the time information operation history (S14). Because the microcomputer 15 executes the processes at S11, S12, S13, S14 in this order, when the time operation is performed at the same time as the clear request, the presence of the time information operation history is not stored.

Next, the microcomputer 15 in the second ECU 4 notifies the first ECU 3 of the time information operation history stored in the volatile storage portion 19 (S15). Then, the microcomputer 15 in the second ECU 4 sets the time acquired from the clock IC 14 to the current time (variable) (S16). The microcomputer 15 notifies the first ECU 3 of the current time (S17).

The second ECU 4 communicates with the first ECU 3 as described above. When there is the clear request of the time information operation history from the first ECU 3, the second ECU 4 deletes the time information operation history. When the operation of the time information is performed, for example, by a user, the second ECU 4 stores the operation history. Then, the microcomputer 15 in the second ECU 4 notifies the first ECU 3 of the time acquired from the clock IC 14 as the current time via the in-vehicle network 12 with the predetermined period.

The second ECU 4 transmits the accurate current time information (e.g., date, hour, minute, second) and the presence or absence of the time information operation history. The second ECU 4 transmits the information of the date so that an elapsed time can be measured with accuracy even if the date is changed after the ignition switch 10 is turned off.

A processing executed by the first ECU 3 will be described. When the microcomputer 5 in the first ECU 3 receives an activation request (e.g., when the ignition switch 10 is turned on), the microcomputer 5 executes a processing illustrated in FIG. 3 with a predetermined period (e.g., 65 ms). At an off-detection time of the ignition switch 10, the microcomputer 5 executes a processing illustrated in FIG. 5 with a predetermined period (e.g., 65 ms).

Figure 3:
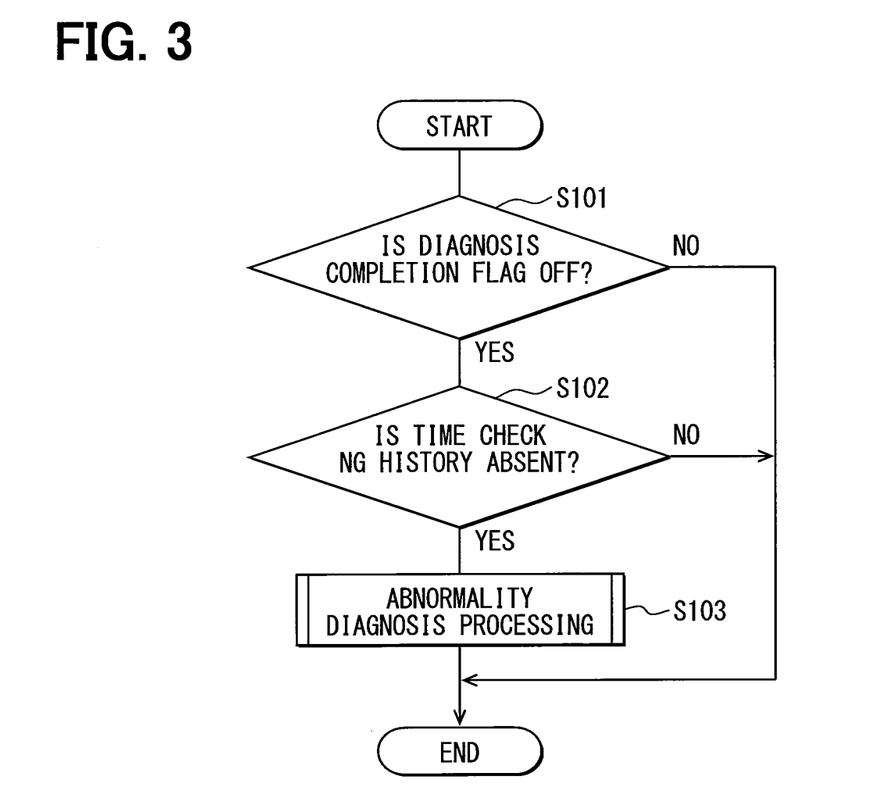
FIG. 3 is a flowchart illustrating a processing executed by a first ECU when the first ECU receives an activation request or at a soak rising time.

At an on-detection time of the ignition switch 10 or at a soak rising time, as illustrated in FIG. 3, the microcomputer 5 in the first ECU 3 confirms whether the diagnosis completion flag is off (S101) and whether the time check NG history of the second ECU 4 is absent (S102). When the above-described conditions are satisfied, the microcomputer 5 proceeds to an abnormality diagnosis processing routine at S103 and executes the abnormality diagnosis processing.

On the other hand, when the time check NG history of the second ECU 4 is present (S102: NO), the first ECU 3 does not proceed to the abnormality diagnosis processing routine and does not execute the abnormality diagnosis processing. This is because even if the abnormality diagnosis processing of the soak timer IC 2 is executed when the time information of the second ECU 4 is inaccurate, an erroneous determination may occur.

As described above, in the microcomputer 5 in the first ECU 3, the initial value of the time check history information is set to "NG history is present." Thus, the first ECU 3 does not execute the abnormality diagnosis processing when the off-time of the ignition switch 10 is not acquired. In addition, when the microcomputer 5 determines NG in a time check processing of the second ECU 4 illustrated in FIG. 4 even once between an off-time of the ignition switch 10 and the next off-time of the ignition switch 10, the time check history information is set to "NG history is present" and the abnormality diagnosis processing is not executed.

Figure 4:
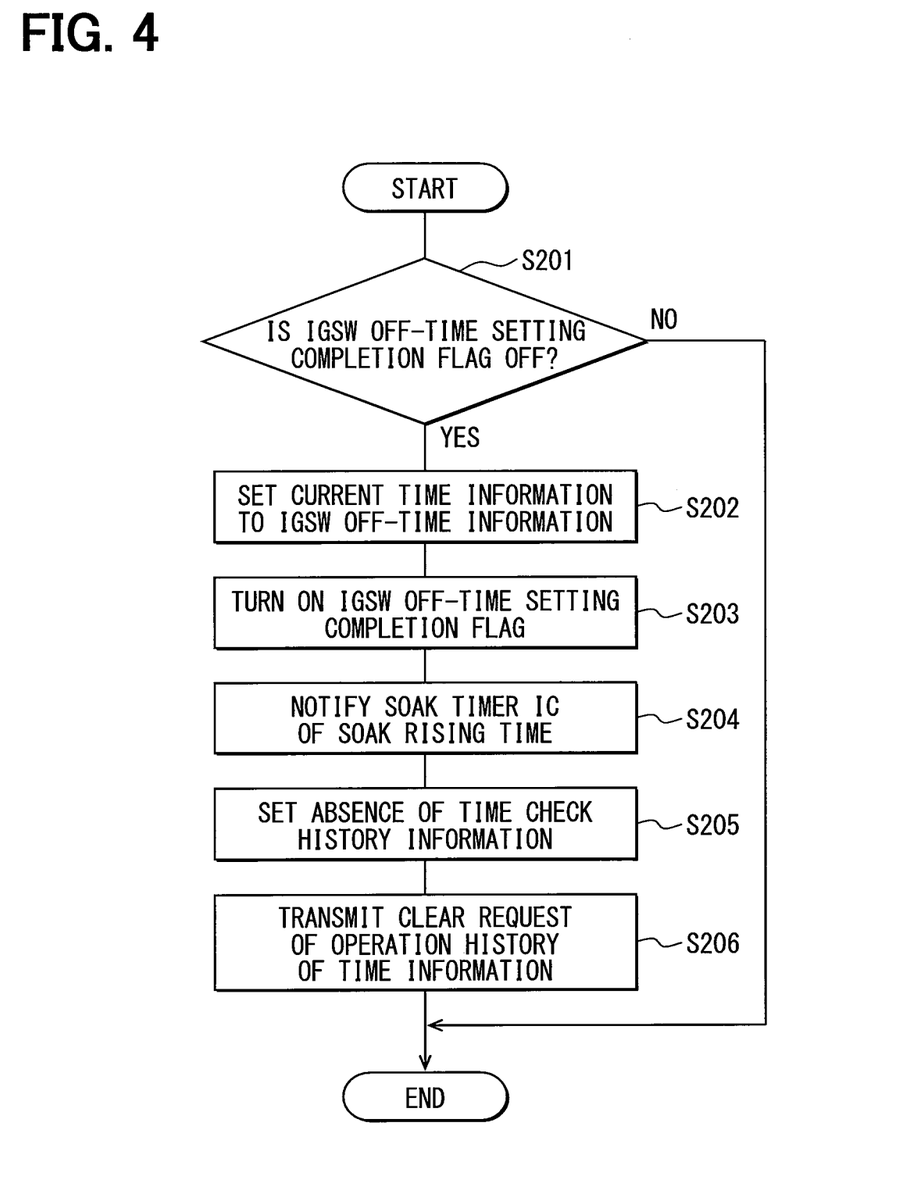
FIG. 4 is a flowchart illustrating a processing executed by the first ECU while an ignition switch is in an off-state.

As illustrated in FIG. 4, in the waiting time for the soak rising time, the microcomputer 5 in the first ECU 3 determines whether the IGSW off-time setting completion flag is off (S201). When the IGSW off-time setting completion flag is off (S201: YES), the microcomputer 5 executes processes from S202 to S206.

When the determination at S201 is affirmative, the microcomputer 5 in the first ECU 3 stores the current time information acquired from the second ECU 4 in the processing routine illustrated in FIG. 2 in the nonvolatile storage portion 7 in the memory 8 as off-time information of the ignition switch 10 (S202). In addition, the microcomputer 5 turns on the IGSW off-time setting completion flag (S203). If the off-time setting completion flag is once turned on, the determination at S201 becomes negative every time the routine in FIG. 4 is called, and the off-time information is not re-updated.

In addition, the microcomputer 5 notifies the soak timer IC 2 of the soak rising time (S204), and the microcomputer 5 sets the absence of the time check history information (S205). The microcomputer 5 transmits the clear request of the time information operation history to the microcomputer 15 in the second ECU 4 (S206). Then, the microcomputer 15 in the second ECU 4 deletes the time information operation history (S206).

In the present embodiment, the NG history of the time check of the second ECU 4 and the operation history of the time information are used as history between the present off-time of the ignition switch 10 and the next off-time of the ignition switch 10. Thus, the operation history is set to absence at a time from S204 to S206.

Figure 5:
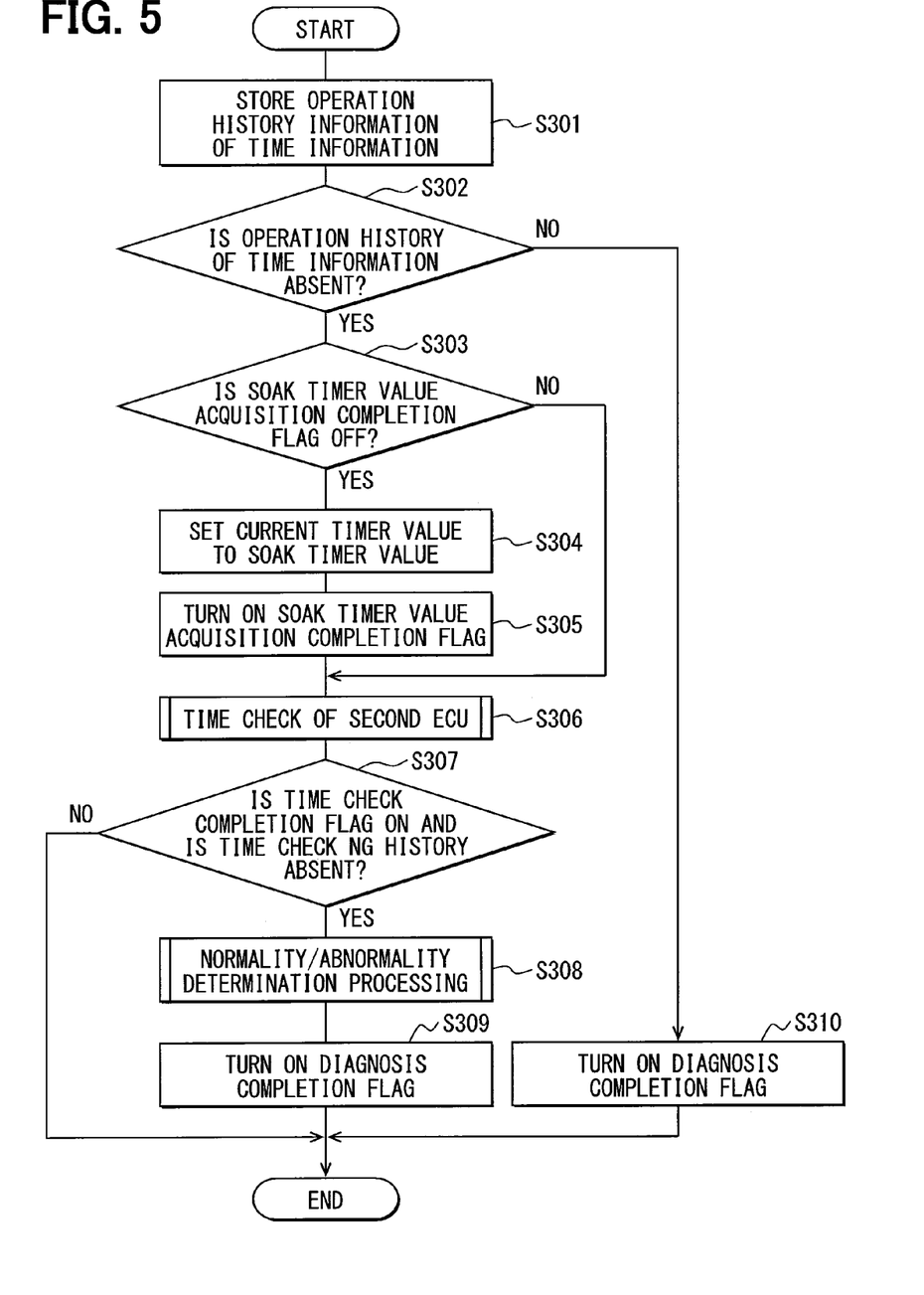
FIG. 5 is a flowchart illustrating an abnormality diagnosis processing.

FIG. 5 is a flowchart illustrating the abnormality diagnosis processing routine executed at S103 in FIG. 3. As illustrated in FIG. 5, the microcomputer 5 communicates with the microcomputer 15 in the second ECU 4 to acquire the operation history information of the time information and stores the operation history information in the volatile storage portion 6 as a variable (S301).

When the microcomputer 5 refers the operation history information and the operation history is absent (S302: YES), the microcomputer 5 executes processes from S303 to S309. When the operation history is present (S302: NO), the microcomputer 5 turns on the diagnosis completion flag and ends the abnormality diagnosis processing. The abnormality diagnosis processing ends when the operation history is present because there is a possibility that the time cannot be measured with accuracy due to the time operation.

When the microcomputer 5 determines that the operation history of the time information is absent (S302: YES), the microcomputer 5 determines whether the soak timer value acquisition completion flag is off (S303). When the soak timer value acquisition completion flag is off (S303: YES), the current timer value of the soak timer IC 2 is set to the soak timer value (variable) (S304).

Then, the microcomputer 5 turns on the soak timer value acquisition completion flag (S305). If the soak timer value acquisition completion flag is once turned on, the determination at S303 becomes negative every time the abnormality diagnosis processing routine is called, the acquisition processing of the soak timer value at S304 is not executed, and the soak timer value is not re-updated.

Next, the microcomputer 5 performs the time check of the second ECU 4 (S306) and determines whether the time check completion flag is on and whether the NG history of the time check of the second ECU 4 is absent (S307). When the determination at S307 is affirmative, the microcomputer 5 executes a normality/abnormality determination processing (S308) and turns on the diagnosis completion flag (S309).

Figure 6:
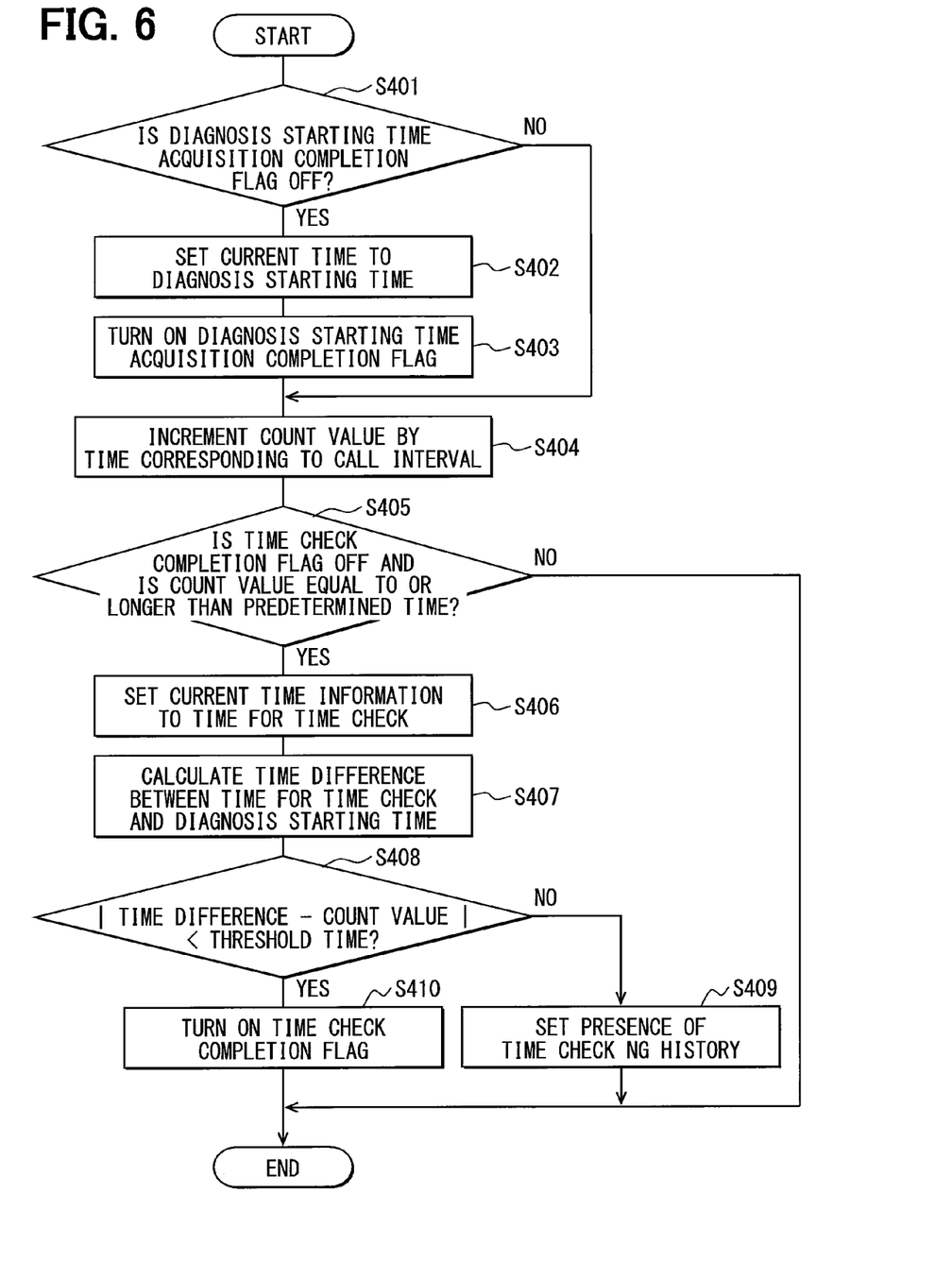
FIG. 6 is a flowchart illustrating a check processing of time information transmitted from the second ECU.

FIG. 6 is a flowchart illustrating the time check processing at S306 in FIG. 5. When the diagnosis starting time acquisition completion flag is off (S401: YES), the microcomputer 5 sets the current time transmitted from the second ECU 4 to the diagnosis starting time (S402).

Then, the microcomputer 5 turns on the diagnosis starting time acquisition completion flag (S403). If the diagnosis starting time acquisition completion flag is once turned on, the determination at S401 becomes negative every time the time check processing illustrated in FIG. 6 is called, the setting processing of the diagnosis starting time at S402 is not executed, and the diagnosis starting time is not re-updated.

Next, the microcomputer 5 increments a count value of a counter by a time corresponding to a call interval (e.g., 65 ms) every time the time check processing is called (S404). Then, the microcomputer 5 waits for a predetermined time (e.g., 10 seconds) at a branch processing (S405).

When the time check processing routine in FIG. 6 is performed several times and the count value becomes equal to or longer than 10 seconds (S405: YES), the microcomputer 5 executes processes from S406 to S410 on condition that the time check completion flag is off. The microcomputer 5 sets the current time information transmitted from the second ECU 4 to the time (variable) for time check (S406). Then, the microcomputer 5 calculates a time difference by subtracting the diagnosis starting time from the time for time check (S407).

The microcomputer 5 compares the absolute value of the difference between the time difference and the count value with a threshold time (e.g., 2 sec) for the time check of the second ECU 4 (S408). When the absolute value is smaller than the threshold time (S408: YES), the microcomputer 5 determines that the time information transmitted from the second ECU 4 is accurate and turns on the time check completion flag (S410). On the other hand, when the absolute value is equal to or longer than the threshold time, the microcomputer 5 sets the presence of the NG history of the time check (S409).

Figure 7:
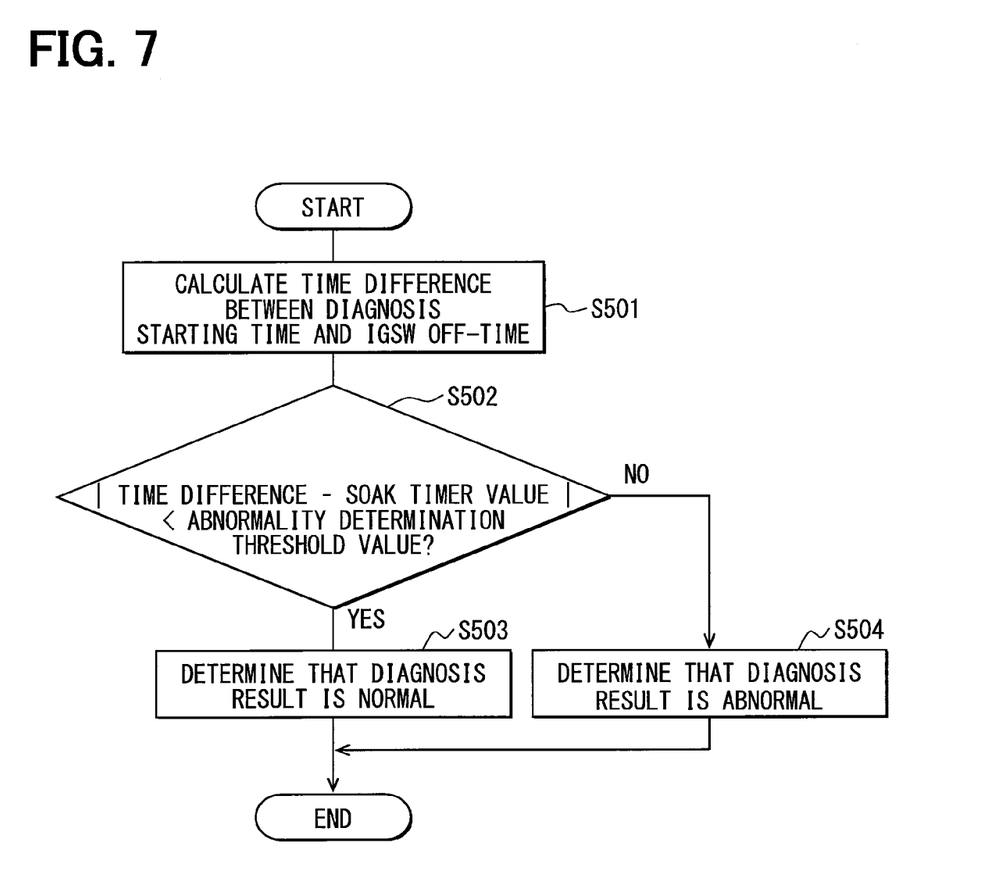
FIG. 7 is a flowchart illustrating a normality/abnormality determination process.

FIG. 7 is a flowchart illustrating the normality/abnormality determination processing routine executed at S308 in FIG. 5. The normality/abnormality determination processing corresponds to an abnormality detection processing. The microcomputer 5 calculates a time difference between the diagnosis starting time and the off-time of the ignition switch 10 (S501). The time difference is an elapsed time from when the ignition switch 10 is turned off to when the diagnosis is started. The microcomputer 5 determines whether the absolute value of a difference between the time difference and the soak timer value calculated in the processing in FIG. 5 is less than an abnormality determined threshold value (e.g., 5 min) (S502). When the absolute value of the difference is less than the abnormality determination threshold value (S502: YES), the microcomputer 5 determines that a diagnosis result of the soak timer IC 2 is normal (S503). When the absolute value of the difference is equal to or greater than the abnormality determination threshold value (S502: NO), the microcomputer determines that the diagnosis result of the soak timer IC2 is abnormal (S504).

In this way, the second ECU 4 executes the processing illustrated in FIG. 2 and the first ECU 3 executes the processes illustrated in FIG. 3 through FIG. 7. The processes will be described along flow of time. At this time, it is assumed that the time operation of the clock IC, for example, by a user is absent and the current time information of the second ECU 4 is accurate.

Figure 8:
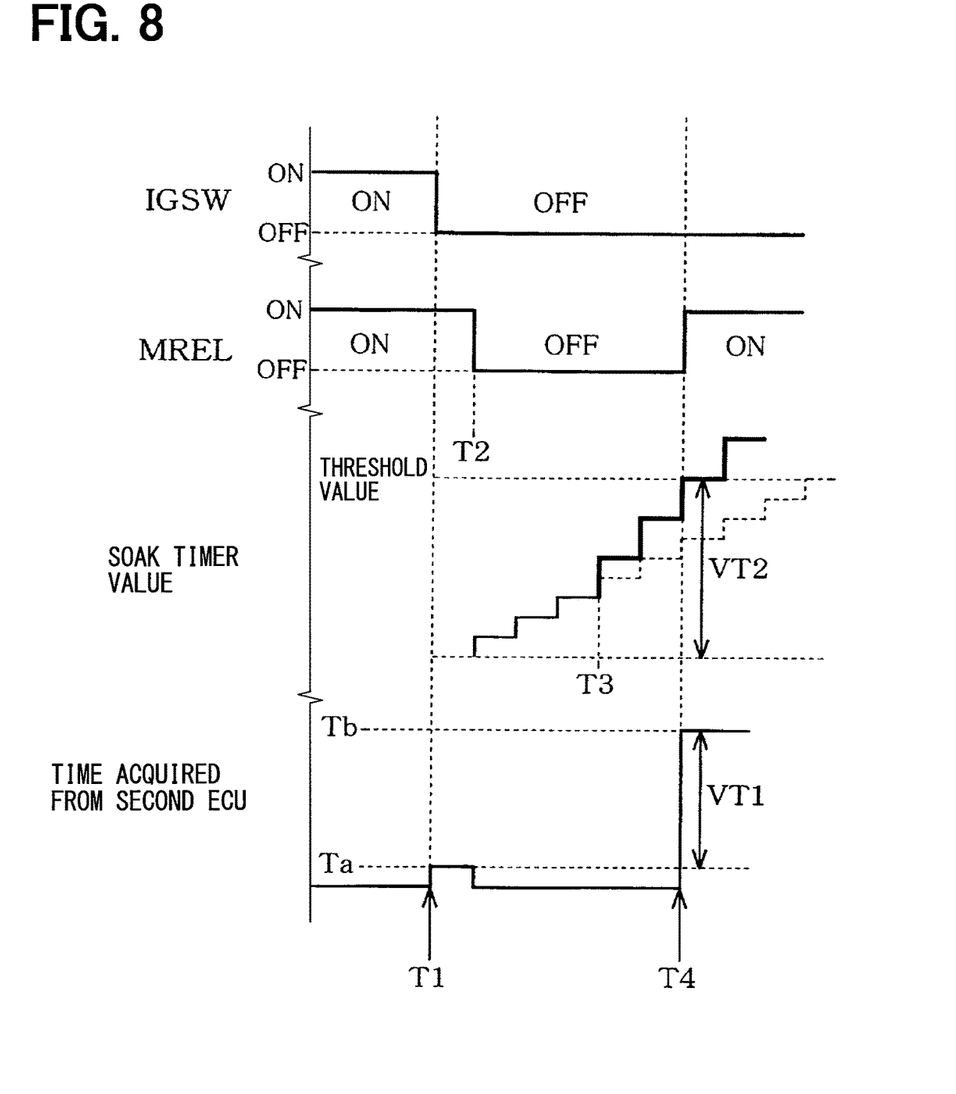
FIG. 8 is a timing diagram illustrating a change of a soak timer value when a measured time of the soaker timer is faster than a normal condition.

FIG. 8 is a timing chart illustrating a case in which an abnormality occurs in the soak timer IC 2 with some cause and the soak timer IC2 counts faster than a normal condition after the main relay 11 is turned off. When the ignition switch 10 is turned from on to off at a time point T1, the main relay 11 is turned off at a time point T2 with a delay from time point T1. The soak timer IC 2 starts counting from the time point T2. When the soak timer IC 2 counts faster than the normal condition with some cause, the count value of the soak timer IC 2 increases faster than the count value in the normal condition (see a time point T3 and after).

Then, the count value of the soak timer IC 2 reaches a predetermined threshold value earlier than the normal condition, and the soak rising occurs earlier than a predetermined soak rising setting time. An operation in the above-described case will be described with reference to the flowcharts. Firstly, at the time point T1 at which the ignition switch 10 is turned off, the first ECU 3 acquires the current time information from the second ECU 4 at S202 in FIG. 4 and stores the off-time information of the ignition switch 10 in the nonvolatile storage portion 7. Then, at S204, the first ECU 3 notifies the soak timer IC 2 of the soak rising time. After that, at the soak rising time, the determinations of the first ECU 3 at S101 and S102 become affirmative, and the first ECU 3 proceeds to the abnormality diagnosis processing at S103. Then, the first ECU 3 sets the current timer value of the soak timer IC 2 to the soak timer value by passing through the processes from S301 to S304 in FIG. 5 and proceeds to the normality/abnormality determination processing illustrated in FIG. 7 by passing through the processes from S305 to S307 in FIG. 5.

At the processes at S501 and S502 in FIG. 4, the first ECU 3 calculates the time difference (VT1 in FIG. 8) by subtracting the off-time of the ignition switch 10 (Ta in FIG. 8) from the diagnosis starting time (Tb in FIG. 8). Then, the first ECU 3 calculates the absolute value of the difference between the time difference (VT1 in FIG. 8) and the soak timer value (VT2 in FIG. 8) and compares the absolute value of the difference with the abnormality determination threshold value at S502 to determine whether the soak timer value is abnormal.

When the soak timer value is excessively greater than the count value in the normal condition (shown by a dashed line in FIG. 8), the difference between the time difference and the soak timer value increases, and the absolute value of the difference becomes equal to or greater than the abnormality determined threshold value. Accordingly, at S504, the first ECU 3 can determine that the diagnosis result of the soak timer IC 2 is abnormal.

Figure 9:
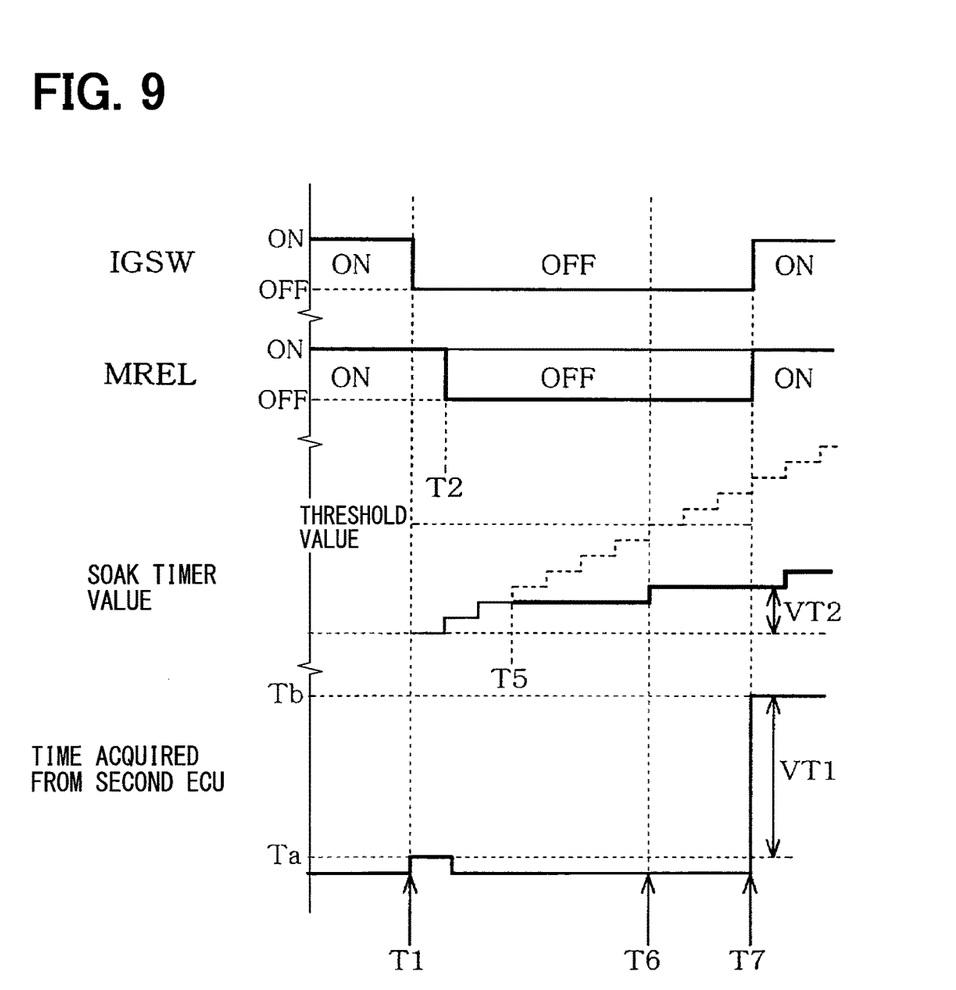
FIG. 9 is a timing diagram illustrating a change of a soak timer value when a measured time of the soaker timer is later than a normal condition.

FIG. 9 is a timing chart illustrating a case in which an abnormality occurs in the soak timer IC 2 and the soak timer IC 2 counts slower than the normal condition after the main relay 11 is turned off. When the soak timer IC 2 counts slower than the normal condition, the count value is excessively less than the soak timer value in the normal condition. Thus, the soak rising does not occur at the predetermined soak rising setting time.

In this case, at the time point T1 at which the ignition switch 10 is turned off, the first ECU 3 acquires the current time information from the second ECU 4 at S202 in FIG. 4 and stores the off-time information of the ignition switch 10. At S204 in FIG. 4, the first ECU 3 notifies the soak timer IC 2 of the soak rising time. However, when the count value of the soak timer IC 2 is excessively less than the count value in the normal condition (see a time point T5 and after in FIG. 9), the soak rising does not occur at the predetermined soak rising setting time. In the normal condition, because the soak timer value reaches the threshold value at a time point T6 in FIG. 9, the main relay 11 is tuned on and the soak rising occurs at the time point T6. However, when the count value of the soak timer IC 2 is excessively less than the count value in the normal condition due to abnormality in the soak timer IC 2, the soak timer value does not reach the threshold value and the soak rising does not occur at the time point T6.

After that, when the ignition switch 10 is turned from off to on at a time point T7, the first ECU 3 executes the abnormality diagnosis processing at S103 in FIG. 3 and proceeds to the setting processing at the soak timer value in FIG. 5 and the normality/abnormality determination processing in FIG. 7. At the processes at S501 and S502 in FIG. 7, the first ECU 3 calculates the time difference (VT1 in FIG. 9) between the diagnosis start time (Tb in FIG. 9) and the off-time of the ignition switch 10 (Ta in FIG. 9) and compares the absolute value of the difference between the time difference and the soak timer value (VT2 in FIG. 9) with the abnormality determination threshold value to determine whether the soak timer value is abnormal.

At this point, when the soak timer value is excessively less than the count value in the normal condition, the difference between the time difference and the soak timer value becomes large, and the absolute value of the difference becomes equal to or greater than the abnormality determined threshold value. Accordingly, the first ECU 3 can determine that the diagnosis result of the soak timer IC 2 is abnormal at S504.

In contrast, when the soak timer value is acquired at a time point at which the ignition switch 10 is turned from off to on and the absolute value of the difference between the time difference and the soak timer value is less than the abnormality determination threshold value, the first ECU 3 can determine that the diagnosis result of the soak timer IC2 is normal at S503. In this way, the first ECU 3 can determine whether the soak timer IC 2 operates normally by checking the progress of the count value of the soak timer IC 2 using the time information acquired from the clock IC 14 in the second ECU 4.

In the present embodiment, the microcomputer 5 in the first ECU 3 acquires the off-time information (corresponding to first time information) of the ignition switch 10 from the second ECU 4 when the ignition switch 10 is turned off (S202), stores the off-time information in the nonvolatile storage portion 7. After that, when the soak timer IC 2 causes the soak rising of the microcomputer 5 or when the ignition switch 10 is turned on, the microcomputer 5 acquires the time information from the second ECU 4 as the diagnosis starting time (corresponding to second time information) (S402). Accordingly, the microcomputer 5 can calculate time as accurately as possible independently from the measured time of the soak timer IC 2. The microcomputer 5 calculates the time difference (corresponding to first time difference) between the diagnosis starting time and the off-time of the ignition switch and determines abnormality of the soak timer IC 2 based on the difference between the time difference and the soak timer value.

Then, if the difference between the time difference and the soak timer value of the soak timer IC 2 is small, the microcomputer 5 determines that the measured time of the soak timer IC 2 is accurate (S503). If the difference between the time difference and the soak timer value is large, the microcomputer 5 determines that abnormality occurs in the soak timer IC 2 and the measured time of the soak timer IC 2 is inaccurate (S504). Accordingly, even if the soak timer IC 2 operates abnormally while the main relay 11 is in the off-state, the abnormality of the soak timer IC 2 can be detected with certainty. In addition, the abnormality can be detected at the soak rising time or when the ignition switch 10 is turned on. Thus, when an abnormality occurs in the soak timer IC 2, a feedback of abnormality detection can be performed quickly.

When the operation history of the time information of the second ECU 4 is present, for example, when a user changes the time information, there is a possibility that an abnormality of the soak timer IC 2 cannot be detected with accuracy. In the present embodiment, the microcomputer 5 in the first ECU 3 includes a first determination section. The first determination section determines not to execute the abnormality detection processing on condition that the operation history of the time information is present, and the first determination section determines to execute the abnormality detection processing on condition that the operation history is absent. Thus, for example, when a user changes the time information, the microcomputer 5 can restrict an erroneous determination by stopping the abnormality detection processing.

For example, when an abnormality occurs in clock function of the clock IC 14 in the second ECU 4, there is a possibility that the presence or absence of abnormality of the soak timer IC 2 cannot be diagnosed with accuracy. In the present embodiment, the microcomputer 5 in the first ECU 3 includes a second determination section. The second determination section determines to execute the abnormality detection processing on condition that the time check result of the time information of the clock IC 14 in the second ECU 4 is within a predetermined allowable range (S408: YES), that is, the microcomputer 5 executes the processing at S308 when the determination at S307 is affirmative. The second determination section determines not to execute the abnormality detection processing on condition that the time check result of the time information of the clock IC 14 in the second ECU 4 is out of the predetermined allowable range (S408: NO), that is, the microcomputer 5 does not execute the processing at S308 when the determination at S307 is negative. Thus, when the time check result is out of the predetermined allowable range, the microcomputer 5 can restrict an erroneous determination by stopping the abnormality detection processing.

In addition, the second determination section in the microcomputer 5 acquires the time information for time check (corresponding to third time information) (S406) when the count value is measured with the counter (S404 through S405) reaches the predetermined time and calculates the time difference (corresponding to second time difference) between the time information for time check and the diagnosis starting time. Then, the second determination section in the microcomputer 5 determines that the time check result is within the predetermined allowable range on condition that the absolute value of the difference between the time difference and the count value is within the threshold time. Because the accuracy of the time information can be confirmed by the above-described processing, the reliability of the abnormality detection processing of the soak timer IC 2 can be improved.

Because the first ECU 3 confirms the accuracy of the time information of the second ECU 4, the first ECU 3 can determine whether the measured time of the second ECU 4 is accurate without determination by the second ECU 4 of whether the measure time is accurate. In other words, because the first ECU 3 as the diagnostic object is configured to execute the confirmation processing of the accuracy of the time information, the function required for the second ECU 4 can be reduced.

In the above-described embodiment, the microcomputer 5 in the first ECU 3 checks the accuracy of the time information of the second ECU 4. However, the microcomputer 15 in the second ECU 4 may confirm the accuracy of the time information. In other words, the second ECU 4 may include the first determination section and the second determination section.

In the above-described embodiment, the activation request of the microcomputer 5 is transmitted from the ignition switch 10. However, there is a case where the activation request is transmitted from the second ECU 4 via the in-vehicle network 12. In this case, the interface 13, which is usually supplied with power, activates the microcomputer 5.

The above-described time may be the absolute time (e.g., 2:30:00 May 1, 2013) or a time based on a predetermined time of a predetermined day (e.g., 1 day+2 hours). The time may be replaced by any valuable that can express a time concept.

What is claimed is:

1. An electronic control unit comprising:
   a control portion including a nonvolatile storage portion and supplied with power when a power switch is in an on-state and stops a processing while the power switch is in an off-state;
   wherein the power switch is different from an ignition switch;
   a soak timer supplied with power regardless of an on-off state of the power switch, the soak timer counting a soak timer value while the power switch is in the off-state and turning on the power switch at fixed intervals based on the soak timer value, thereby activating the control portion, and
   an interface performing a data communication with a clock device which is disposed outside of the electronic control unit, wherein
   the interface transmits data of the data communication to the nonvolatile storage portion,
   the nonvolatile storage portion keeps the data even when the power switch is turned off,
   the control portion has an abnormality diagnostic function of detecting an abnormality in the soak timer value counted by the soak timer,
   the control portion acquires first time information of the clock device when the power switch is turned off and stores the first time information in the nonvolatile storage portion, and
   the control portion acquires second time information of the clock device when the soak timer activates the control portion or when the control portion receives an activation request, calculates a first time difference between the second time information and the first time information stored in the nonvolatile storage portion, and determines an abnormality of the soak timer based a difference between the first time difference and the soak timer value counted by the soak timer.

2. The electronic control unit according to claim 1, further comprising
   a first determination section determining not to execute an abnormality detection processing of the soak timer on condition that an operation history of a clock information of the clock device is present and determining to execute the abnormality detection processing of the soak timer on condition that the operation history of the time information of the clock device is absent.

3. The electronic control unit according to claim 1, further comprising
   a second determination section determining to execute an abnormality detection processing of the soak timer on condition that a time check result of the time information of the clock device is within a predetermined allowable range and determining not to execute the abnormality detection processing of the soak timer on condition that the time check result of the time information of the clock device is out of the predetermined allowable range.

4. The electronic control unit according to claim 3, wherein
   the second determination section acquires a third time information for a time check when a count value measured by a counter after the second time information is acquired from the clock device,
   the second determination section calculates a second time difference between the third time information and the second time information, and
   on condition that an absolute value of a difference between the second time difference and the count value is less than a threshold time, the second determination section determines that the time check result of the time information of the clock device is within the predetermined allowable range and determines to execute the abnormality detection processing of the soak timer.

5. The electronic control unit according to claim 2, further comprising
   a second determination section determining to execute an abnormality detection processing of the soak timer on condition that a time check result of the time information of the clock device is within a predetermined allowable range and determining not to execute the abnormality detection processing of the soak timer on condition that the time check result of the time information of the clock device is out of the predetermined allowable range.

6. The electronic control unit according to claim 5, wherein
   the second determination section acquires a third time information for a time check when a count value measured by a counter after the second time information is acquired from the clock device,
   the second determination section calculates a second time difference between the third time information and the second time information, and
   on condition that an absolute value of a difference between the second time difference and the count value is less than a threshold time, the second determination section determines that the time check result of the time information of the clock device is within the predetermined allowable range and determines to execute the abnormality detection processing of the soak timer.

7. An electronic control unit comprising:
a control portion supplied with power when a power switch is in an on-state and stops a processing while the power switch is in an off-state;
wherein the power switch is different from an ignition switch;
a soak timer supplied with power regardless of an on-off state of the power switch, the soak timer counting a soak timer value while the power switch is in the off-state and turning on the power switch at fixed intervals based on the soak timer value, thereby activating the control portion;
a nonvolatile storage portion keeping data even when the power switch is turned off; and
an interface performing a data communication with a clock device which is disposed outside of the electronic control unit, the interface transmitting data of the data communication to the nonvolatile storage portion, wherein
the clock device measures a time as time information, and includes an operation history storage portion which stores a change history of the time information as an operation history when the time information of the clock device is changed,
the control portion has an abnormality diagnostic function of detecting an abnormality in the soak timer value counted by the soak timer,
the control portion, when the power switch is turned off, acquires first time information of the clock device, stores the first time information in the nonvolatile storage portion, and deletes the operation history stored in the operation history storage portion of the clock device,
the control portion includes a first determination section which determines, when the soak timer activates the control portion or when the control portion receives an activation request, whether the operation history is stored in the operation history storage portion, based on the data communication between the interface and the clock device,
the control portion determines to execute an abnormality detection processing of the soak timer when the first determination section determines that the operation history is not stored in the operation history storage portion,
the control portion determines not to execute the abnormality detection processing of the soak timer when the first determination section determines that the operation history is stored in the operation history storage portion, and
when the control portion determines to execute the abnormality detection processing of the soak timer, the control portion acquires second time information of the clock device, calculates a first time difference between the second time information and the first time information stored in the nonvolatile storage portion, and determines an abnormality of the soak timer based a difference between the first time difference and the soak timer value counted by the soak timer.

8. The electronic control unit according to claim 7, further comprising
a checking portion including a counter measuring a count value and checking whether the time information of the clock device is within a predetermined allowable range, and
a second determination section determining to execute an abnormality detection processing of the soak timer when the checked time information of the clock device is within the predetermined allowable range, and determining not to execute the abnormality detection processing of the soak timer when the checked time information of the clock device is out of the predetermined allowable range, wherein
the second determination section acquires a third time information for a time check when the count value measured by the counter after the second time information is acquired from the clock device,
the second determination section calculates a second time difference between the third time information and the second time information, and
when an absolute value of a difference between the second time difference and the count value is less than a threshold time, the checking portion determines that the checked time information of the clock device is within the predetermined allowable range, and the second determination section determines to execute the abnormality detection processing of the soak timer.

* * * * *